United States Patent [19]

Sisson

[11] 3,795,426
[45] Mar. 5, 1974

[54] ACTUATION MEANS RESPONSIVE TO A SENSED BRAKING CONDITION FOR ACTIVATING A SERVOMOTOR

[75] Inventor: Albert E. Sisson, Southfield, Mich.
[73] Assignee: The Bendix Corporation, South Bend, Ind.
[22] Filed: Mar. 30, 1973
[21] Appl. No.: 346,394

[52] U.S. Cl............... 303/21 F, 60/534, 91/376, 180/82 R
[51] Int. Cl............................................. B60t 8/04
[58] Field of Search....... 303/21 F, 40; 91/367, 376, 91/363 R, 189; 60/534, 547; 180/82 R; 246/182 B

[56] References Cited
UNITED STATES PATENTS
3,712,126  1/1973  Campbell........................ 73/117
3,617,099  11/1971 Sugiyama..................... 303/21 AF
3,608,982  9/1971  Inada............................... 303/21 F
3,362,298  1/1968  Julow............................... 91/376

Primary Examiner—Trygve M. Blix
Assistant Examiner—Randolph A. Reese
Attorney, Agent, or Firm—Leo H. McCormick, Jr.; William N. Antonis

[57] ABSTRACT

A solenoid actuator connected to a servomotor for operating a control valve in response to an automatic input force overriding a manual input force when a sensed speed condition indicates a closure distance between a vehicle and an object exceeds a predetermined rate.

10 Claims, 1 Drawing Figure

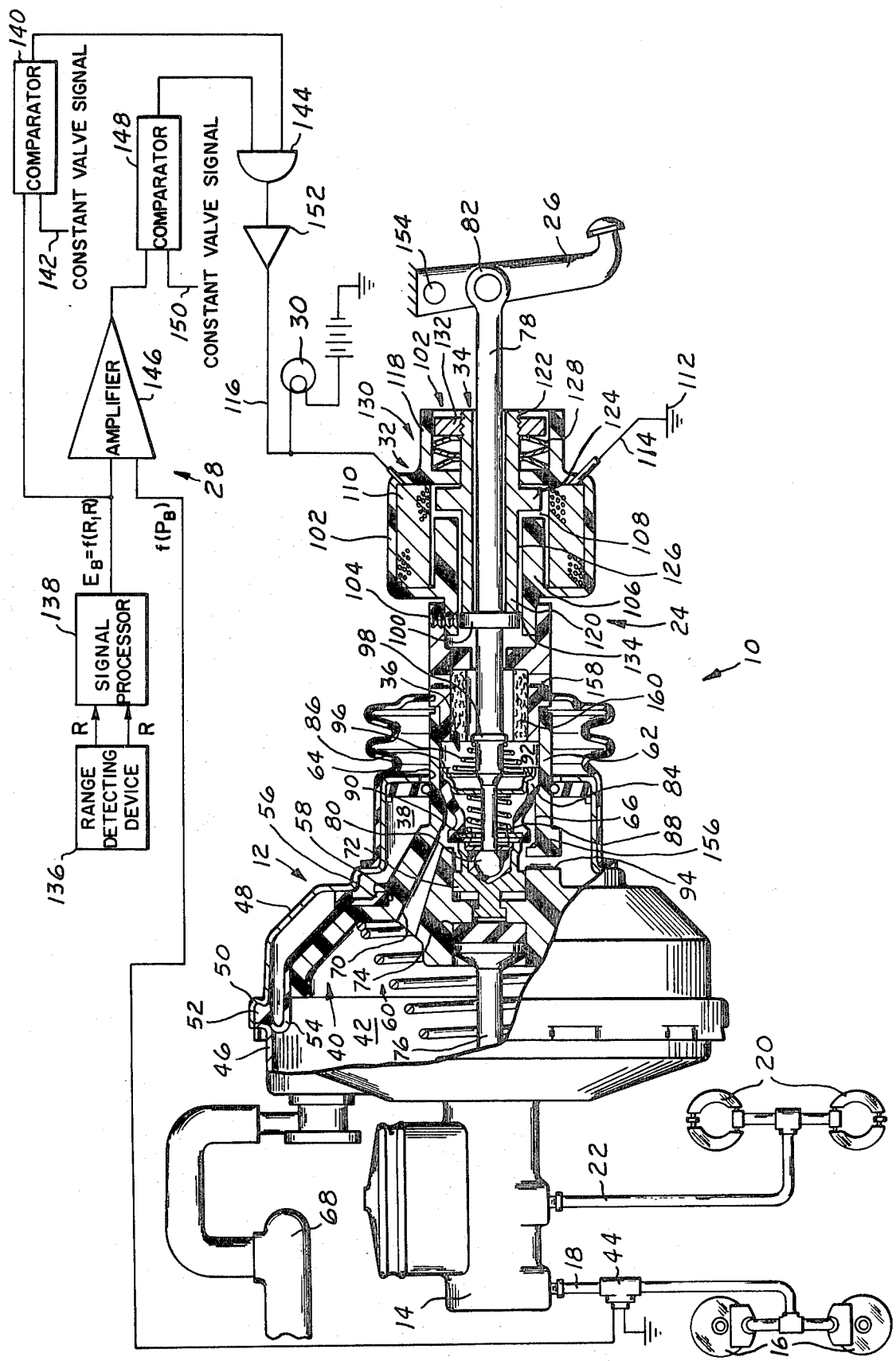

ACTUATION MEANS RESPONSIVE TO A SENSED BRAKING CONDITION FOR ACTIVATING A SERVOMOTOR

BACKGROUND OF THE INVENTION

Rear end collisions are the cause of a major portion of highway fatalities and cause personal injury and property damage exceeding billions of dollars each year. In anticipation of Federal legislation resulting from a demand for better safety equipment on vehicles, many types of adaptive speed controls and obstacle avoidance systems have been proposed. U.S. Patent application Ser. No. 293,301, assigned to the same assignee of this application and incorporated herein by reference, illustrates such an obstacle avoidance system for use in conjunction with a power braking system. In this braking system, a first solenoid controls the communication of vacuum to the front chamber of a servomotor and a second solenoid controls the communication of air at atmospheric pressure to the rear chamber of the servomotor. The first and second solenoids are controlled by electrical signals derived by analyzing a signal derived from a range detecting device and the output from the servomotor. The first and second solenoids must operate with complete synchronization; otherwise a high surge of hydraulic fluid will rapidly activate the wheel brakes causing non-uniform deceleration.

SUMMARY OF THE INVENTION

I have devised an actuation means for use in a servomotor which is selectively responsive to a manual input force from an operator and a computed input force responsive to a signal derived from a sensed speed condition. The actuation means includes a push rod means having a first end attached to the brake pedal and a second end connected to the control valve of the servomotor. The push rod means has a shaft with an annular shoulder located thereon. A sleeve means located between the annular shoulder and the brake pedal surrounds the shaft. The sleeve has a rib or a series of keys which extend into a slot located in a housing which retains a coil of a solenoid means. The sleeve is held against the housing of the solenoid away from the control valve means by a resilient means. Range detecting means located on the vehicle constantly monitor the spacial area immediately in front of the vehicle to detect any obstacle in the immediate path thereof. An obstacle signal from the range detector is relayed to an analyzer means and is compared with a brake output signal. If the distance between an obstacle and the vehicle is decreasing at a rate wherein braking deceleration would be uncomfortable, an energizing signal is sent to activate the coil and move the sleeve into engagement with the shoulder to operate the control valve. Upon operation of the control valve, a pressure differential will be created in the servomotor to activate the wheel brake and reduce the speed of the vehicle. Simultaneously, with the energization of the coil of the solenoid, an indicator is activated informing the operator of the vehicle of an obstacle in the vehicle path. The operator when informed of this sensed speed condition, if the vehicle is being operated on a multi-lane highway, can merely shift to a free unobstructed lane to avoid the obstacle or on a single lane highway, apply an input force to the foot pedal to more rapidly cause a pressure differential build-up in a brake condition. However, if the operator is distracted upon the indicator being activated and takes no corrective measures to reduce the closure rate before a damaging collision can occur, the automatic input signal will bring the vehicle to a stop.

It is therefore the object of this invention to provide a servomotor with actuation means selectively responsive to an automatic input force and/or a manual input force for operating a control valve which regulates the creation of an operational pressure differential in the servomotor.

It is another object of this invention to provide a servomotor with an automatic override for a manual input force to selectively operate a control valve in response to a sensed speed condition in relationship to a comfortable braking deceleration associated with avoidance of an obstacle.

It is still a further object of this invention to provide an operator with a visual indication of a sensed speed condition requiring a braking deceleration to avoid an obstacle.

These and other objects will be apparent from reading this specification and viewing the drawings.

BRIEF DESCRIPTION OF THE DRAWING

The drawing shows a schematic of a power braking system with a sectional view of a servomotor having an actuation means selectively responsive to a manual input from an operator and a computed input force derived from comparing the rate of closure between the vehicle and an obstacle to provide a comfortable braking deceleration to avoid the obstacle.

DETAILED DESCRIPTION OF THE PREFERRED EMBODIMENT

The power braking system 10 shown in the drawing is made up of a servomotor means 12 which is attached to a master cylinder 14 for supplying the front wheel cylinder 16 of the vehicle with hydraulic fluid under pressure through conduit 18 and the rear wheel cylinders 20 with hydraulic fluid under pressure through conduit 22. An actuation means 24 supplies the servomotor means 12 with an operational input force to produce a comfortable rate of braking deceleration. The actuation means 24 is selectively responsive to a manual input supplied through brake pedal 26 from an operator and a computed input force from a speed sensing analyzer means 28. The speed sensing analyzer means 28 monitors the spacial area in front of the vehicle and upon detecting an obstacle in the path thereof determines the distance thereto. An obstacle signal representative of the distance between an object and the vehicle is continually compared with a stopping signal representative of a comfortable deceleration rate. When the obstacle signal exceeds the stopping signal, an energizing signal is developed and transmitted to the actuation means 24. The energizing signal will simultaneously activate an indicator 30 to inform the operator of the obstacle in the path of the vehicle and a solenoid means 32. With the solenoid means energized, a plunger means 34 will move the operational control valve means 36 in the servomotor 12. Upon movement of the control valve means 36, air at atmospheric pressure is allowed to enter into the rear chamber 38 and create a pressure differential across wall means 40 with vacuum in the front chamber 42. This pressure differential will move the wall means 40 and create an output force which in turn moves a piston means (not shown) in the master cylinder to supply hydraulic fluid under pressure to the front wheel cylinder 16 and the rear wheel cylinders 20. A pressure transducer means 44 located in conduit 18 will relay an actuation signal to the analyzer means 28 to modify the indicated safe deceleration signal with respect to the continually changing obstacle signal. If the operator has failed to heed the indicator 30, the energizing signal from the analyzer means will be continually increased to maintain a safe stopping distance between the vehicle and the obstacle.

In more particular detail the servomotor 12 includes a front shell 46 joined to a rear shell 48 by a twist lock connection 50 which holds the external bead 52 of the diaphragm 54 of the wall means 40. The diaphragm 54 has an internal bead 56 which snaps into groove 58 in a hub means 60 of the wall means 40. The hub means 60 has an axial projection 62 which extends through an opening 64 in the rear shell 48. The axial projection has a bore 66 therethrough for retaining the control valve means 36.

The control valve means 36 will regulate the communication of vacuum between the front chamber 42 and the rear chamber 38 by closing passage 70 in response to an actuation signal and opening passage 70 in the absence of an actuation signal. The control valve means 36 has a plunger 72 which slides along the bore 66 into engagement with a reaction disc 74 adjacent the output push rod 76 in response to an input force from the actuation push rod 78.

The actuation push rod 78 has a hemispherical head 80 on a first end thereof and an eye 82 on the other end. A resilient poppet 84 is located in the bore 66 by a retainer 86 which surrounds the push rod 78 adjacent the hemispherical head 80. A first spring 88 has a first end positioned against the retainer 86 and a second end positioned against a support ring 90 on the end of the resilient poppet 84. The first spring 88 will urge the support ring 90 toward the plunger 72 to separate the atmospheric chamber 92 from the first passage 70 and a second passage 94. A second spring 96 has a first end positioned against the retainer 86 and a second positioned against a first shoulder 98 on the push rod 78. The second spring 96 returns the push rod 78 upon termination of an input force on brake pedel 26. The push rod 78 has a second annular shoulder 100 located between the first shoulder 98 and eye 82.

The solenoid means 32 has a housing 102 which is connected to the axial projection 62 by a plurality of fasteners 104. The housing 102 has a cylindrical section 106 which is concentric to the push rod 78 with an annular slot 108 located therein. A coil 110 is retained in the housing and is connected to an electrical ground 112 through lead 114 and to the analyzer means 28 through lead 116. The housing has an axial projection 118 which extends rearwardly from the housing 102 to retain an adjustment means 130 for establishing a stop for the annular shoulder 100.

The plunger means 34 has a sleeve 120 with a first end adapted to engage the second annular shoulder 100 on the push rod 78 and a second end with threads 122 thereon. A rib 124 extends from the peripheral surface 126 of the sleeve 120 into the slots 108 in the cylindrical section 106 of the housing 102.

A resilient means 128 composed of several belleville springs are located in the axial projection 118 and held therein against a stop 130 by a keeper 132 which engages threads 122 on the sleeve 120.

In the rest position of the brake pedal 26 the keeper 132 is adjusted such that end 134 of the sleeve 120 meets the second annular shoulder 100 without placing a resistive force on the return spring 96.

The speed sensing analyzer means 28 includes an obstacle detecting device 136 which can determine the range and range-rate between a vehicle on which the device is mounted and an obstacle or target object in front of the vehicle. The detecting device converts signals representative of the range and range-rate of the target into an obstacle signal. The system employed utilizes microwave energy which not only has the capability of being transmitted and received, but the advantage of simplicity of generation and detection. Since both range R and range-rate R information is needed, a Doppler type radar system suggests a convenient expedient to obtaining this information. The Doppler radar system is more specifically a Gunn diode Doppler radar where a variable voltage is applied to the Gunn diode so that two discreet frequencies are transmitted on a time-sharing basis. The reflected energy from the target creates two Doppler frequencies which form a composite signal. The phase relationship of the two Doppler frequencies is representative of the range between the radar system and the target or obstacle and the Doppler frequency per se is representative of or directly related to the relative velocity between the radar system transmitting antenna and the target or obstacle from which the energy received is reflected. For a complete description of the Doppler system which forms a part of this invention see U.S. Pat. No. 3,659,293, assigned to the common assignee of this application and incorporated herein by reference.

The radar system of the detector device 136 extracts the range and range-rate data from the reflected signals received from the target. This data comprising signals representative of the range R and range-rate R of the target are fed into a signal processor 138 which generates a signal $E_B$ that is a function of the range R and range-rate R between the vehicle being braked and a target or obstacle in the vehicle's path. The signal $E_B$ is fed into the first comparator 140 which also receives an initiating constant voltage signal on lead 142 which represents an undesired braking condition of the vehicle with respect to its relationship of range and range-rate to the target. If the signal $E_B$ is greater than the predetermined initiating constant signal, $E_C$, appearing on lead 142 the comparator 140 will change state. The output of the comparator 140 is fed into an AND gate 144.

The signal $E_B$ from the signal processor 138 also serves as one input to an amplifier 146. The amplifier 146 receives a second electric signal input from pressure transducer 44. The input signal voltage generated by the transducer 44 and designated by the symbol $P_B$ is a function of brake pressure developed by the master cylinder 14. It is understood that this brake pressure may be sensed at any desired location within the brake system. The output from amplifier 146 is connected to a second comparator 148. The comparator 148 is supplied with a constant value input or bias through lead 150 which prevents undesirable fluctuations or hunting of the solenoid means 32 to which it is connected when the voltage signal produced by $P_B$ is equal to $E_B$. The output of the second comparator 148 is fed into the AND gate circuit 144 which, as aforementioned, is also connected to the output of the first comparator 140. The output from AND gate 144 is run through power amplifier 152 which drives the coil 110 upon energization.

The comparator 148 is set so that it has no output when $E_B$ is less than $P_B$. This, of course, inhibits AND gate 144 from generating an output of its own. However, when $E_B$ is equal to or greater than $P_B$, the comparator 148 has an output which is fed to AND gate 144. Since AND gate 144 is now activated by $E_B$, the outputs of comparators 140 and 148, and AND gate 144 generates output signal which is connected to the solenoid means 32.

The following table illustrates the operational conditions necessary for the solenoid means to become energized:

| Condition | Solenoid Valve | Brake Pressure |
|---|---|---|
| $E_B<E_C$ | Deactivated | 0 |
| $E_B>P_B>E_C$ | Activated | Rising |
| $E_B=P_B$ | Activated | Holding |
| $E_B<P_B>E_C$ | Deactivated | Decreasing |

MODE OF OPERATION OF THE PREFERRED EMBODIMENT

Under normal driving conditions and in the absence of a signal $E_B$ indicating an obstacle in front of the vehicle, highway braking is achieved by an operator supplying an input force to the brake pedal 26. The input force causes the brake pedal to pivot an eye 154 and transmit movement to push rod 78. Push rod 78 will slide plunger 72 in bore 66 to permit the first spring 88 to urge the poppet 84 onto seat 156 and interrupt vacuum communication between the front chamber 42 and rear chamber 38 through the first passage 70. Further movement of the push rod will move the plunger 72 away from the poppet means 84 to allow air from the atmosphere to flow through ports 158 past filters 160 into the atmospheric chamber 92 and out the second passage 94 to the rear chamber 38. With air under pressure in the rear chamber 38 and vacuum in the front chamber 42, a pressure differential is created which moves the wall means 40. As wall means 40 moves the push rod 76 will correspondingly move pistons in the master cylinder 14 to pressurize the hydraulic pressure therein for operating the front wheel cylinder 16 and the rear wheel cylinders 20. The pressure transducer 44 will send a pressure signal $P_B$ through the amplifier 146 to the comparator 148. The comparator 148 in turn will transmit a braking signal to the AND gate 144 but in the absence of an obstacle signal $E_B$ being generated by the range detector 136, the AND gate 144 will remain inoperative and solenoid means 32 inactivated.

Upon terminating the input force on the brake pedal 26, the return spring 96 will move the plunger 72 against the poppet means 84 to prevent air from entering the second passage 94. Further movement of the push rod 78 by the second spring 76 will pull the poppet means 84 away from seat 156 to allow the vacuum developed at the intake manifold 68 to evacuate the air from the rear chamber 38.

Upon the range detector 136 perceiving an obstacle in the path of the vehicle, the range and rate of closure will be determined to generate an obstacle signal $E_B$. As long as $E_B$ is less than the constant signal $E_C$ in the comparator 140 the output therefrom will be insufficient to operate the AND gate 144 and the solenoid means 32 will remain inactivated. However, when $E_B$ becomes larger than $E_C$, the AND gate 144 will be activated and an operational signal sent through amplifier 152 to simultaneously activate the indicator 30 and coil 110. With coil 110 activated, lines of magnetic flux will cause the sleeve 120 to move and exert a force on the second shoulder 100 after overcoming the belleville springs 128. The automatic input force from the solenoid means 32 will sequentially operate the control valve means 36 to allow air to enter the rear chamber 38 and create a pressure differential across the wall means 40. This pressure differential will correspondingly be the operational force which pressure is the hydraulic fluid in the master cylinder 14. The front and rear wheel cylinders 16 and 20 will respond to the hydraulic fluid and a braking force correspondingly reduces the speed of the vehicle. At the same time the transducer means 44 will relay a signal $P_B$ representative of this hydraulic pressure to the amplifier 146. The amplifier 146 in turn transmits the signal to the comparator 148 and analyzes this signal with the initiating signal 150. If $P_B$ is greater than the initiating signal, the output to the AND gate will nullify the signal from comparator 140 causing the output from the amplifier 132 to be interrupted whereby the solenoid means 32 will be deactivated.

However, if $P_B$ is less than the initiating signal or lead 150, the output from the first comparator may have been updated and provide a stronger signal to operate the solenoid means 32.

Normally, if the operator is aware of the operational conditions of his vehicle upon indicator 30 initially supplying a sign that an obstacle blocks the path of the vehicle, a manual input will be supplied through the pedal 26 to brake the vehicle as described above. However, if the driver due to his inability to judge distance, miscalculates the rate of closure and a comfortable deceleration rate associated therewith since the range detector is continually monitoring the obstacle if $E_B$ remains greater than $P_B$, the solenoid is energized and an automatic input force transmitted through the sleeve 120 to operate the control valve 36 to reduce the speed of the vehicle.

Thus, I have provided a means for reducing the speed of a vehicle through an automatically controlled actuation means 32 responsive to a sensed speed condition associated with a comfortable rate of deceleration to avoid an obstacle which could damage a vehicle or injure the occupant thereof.

I claim:

1. A servomotor for use in a power braking system of a vehicle having actuation means selectively responsive to a manual input force from a brake pedal and a computed input force responsive to a signal derived from a sensed speed condition for operating a control valve which regulates the creation of a pressure differential across a wall to develop an output force supplied to a brake actuating means, said actuation means comprising:

push rod means having a shaft with a first end connected to said control valve and a second end connected to said brake pedal, said shaft having an annular shoulder thereon;

sleeve means surrounding said shaft and located between said annular shoulder and said brake pedal; and solenoid means surrounding said sleeve and responsive to said signal for urging said sleeve against said shoulder to cause said push rod to move and operate said control valve.

2. The servomotor, as recited in claim 1, wherein said solenoid means includes:

a housing surrounding said sleeve means and connected to said wall; and stop means secured to said housing for limiting the movement of said sleeve with respect thereto.

3. The servomotor, as recited in claim 2, wherein said sleeve means includes:

a rib extending radially from a peripheral surface of said sleeve into corresponding slots in the housing of the solenoid, said slots having an axial width greater than said rib and substantially equal to the distance reqired to move and maintain said control valve in an operational mode.

4. The servomotor, as recited in claim 3, wherein said stop means includes:

an adjustable keeper attached to said sleeve means for modifying the operational mode developed in response to said signal.

5. The servomotor, as recited in claim 4, wherein said stop means further includes:

resilient means acting on said retainer for resisting the movement of said sleeve in response to said signal to provide uniformity in the actuation of said control valve and for holding said sleeve against said housing upon said shaft receiving said manual input signal.

6. The servomotor, as recited in claim 5, wherein said automatic input force will override the manual input force when a sensed speed condition indicates a closure rate between said vehicle and an object exceeds a predetermined rate.

7. The servomotor, as recited in claim 6, wherein said solenoid means includes:

indicator means for informing an operator that an automatic input force is activating a control valve in response to a sensed speed condition.

8. The servomotor, as recited in claim 3, wherein said stop means includes:

resilient means for resisting the movement of said sleeve means to provide a smooth transition for the automatic operational mode.

9. The servomotor, as recited in claim 8, wherein said solenoid means includes:

indicator means for informing an operator that an automatic input force is activating a control valve in response to a sensed speed condition.

10. The servomotor, as recited in claim 9, wherein said solenoid means includes:

transducer means for converting a pressure representative of said output signal into an electrical signal, said electrical signal being compared with said signal derived from the sensed speed condition to activate said solenoid means and establish said automatic input force.

* * * * *

UNITED STATES PATENT OFFICE
CERTIFICATE OF CORRECTION

PATENT NO. : 3,795,426
DATED : March 5, 1974
INVENTOR(S) : ALBERT E. SISSON

It is certified that error appears in the above-identified patent and that said Letters Patent are hereby corrected as shown below:

Column 4, Line 17, change "range-rate R" to --range-rate $\dot{R}$--.

Column 4, Line 39, change "range-rate R" to --range-rate $\dot{R}$--.

Column 4, Line 42, change "range-rate R" to --range-rate $\dot{R}$--.

Signed and sealed this 29th day of April 1975.

(SEAL)
Attest:

RUTH C. MASON
Attesting Officer

C. MARSHALL DANN
Commissioner of Patents
and Trademarks